United States Patent [19]
Reed

[11] Patent Number: 5,286,555
[45] Date of Patent: Feb. 15, 1994

[54] MULTILAYER SURFACE STRUCTURE COMPRISING LAYERS OF FIBER REINFORCED ELASTOMERIC MATERIAL, PARTICULATE MATERIALS AND A PROTECTIVE COATING

[76] Inventor: William C. Reed, P.O. Box 1267, Marathon, Fla. 33050

[21] Appl. No.: 709,672

[22] Filed: Jun. 3, 1991

[51] Int. Cl.[5] .................. B32B 5/16; B06N 7/04; B02G 3/00
[52] U.S. Cl. ................. 428/283; 428/142; 428/143; 428/144; 428/149; 428/150; 428/284; 428/286; 428/373; 428/703; 428/908.8
[58] Field of Search ............ 428/284, 286, 287, 290, 428/373, 303, 688, 968.8, 454, 142, 143, 144, 149, 150

[56] References Cited

U.S. PATENT DOCUMENTS

| | | | |
|---|---|---|---|
| 2,951,001 | 8/1960 | Rubenstein | 428/142 |
| 4,122,224 | 10/1978 | Brewer et al. | 428/142 |
| 4,454,191 | 6/1984 | von Blücher et al. | 428/290 |
| 4,467,007 | 8/1984 | Elgie | 428/142 |
| 4,636,414 | 1/1987 | Tajima et al. | 428/143 |
| 4,689,259 | 8/1987 | Miller, Jr. et al. | 428/142 |

*Primary Examiner*—George F. Lesmes
*Assistant Examiner*—James D. Withers
*Attorney, Agent, or Firm*—Malloy & Malloy

[57] ABSTRACT

For covering the outer surface of a structure, an outer surface structure of a layer of elastomeric material with a sheet of fabric embedded in the elastomeric material includes an outer coating of silica sand to receive a second layer of rigid material bonded and covering the surface structure, such as a gypsum material or plastic material.

6 Claims, 1 Drawing Sheet

MULTILAYER SURFACE STRUCTURE COMPRISING LAYERS OF FIBER REINFORCED ELASTOMERIC MATERIAL, PARTICULATE MATERIALS AND A PROTECTIVE COATING

FIELD OF THE INVENTION

This invention relates to coatings for an underlying surface.

SUMMARY OF THE INVENTION

This invention is of an outer surface structure applied to the outer surface of an underlying structure, or substrate, which may be of steel, concrete, plywood, aluminum or the like. Uses for the invention are applicable, among many others, to providing an outer surface on roofing, heavily traveled walkways, boat docks, wooden decks, swimming pools, and liners for spas, such as are often found in restaurants, motels, hotels, various residences, businesses, and industrial sites. The outer surface of an underlying structure is first coated with a first layer of elastomeric material in which there is embedded a sheet of fabric, preferably, a spun bonded, non-woven carrier composed of a co-axial, bi-component fiber with a polyester core and polyamide skin such as that which is available commercially from the BASF Corporation, Fibers Division, Williamsburg, Va. which is isotropic and strong in each direction. To the outer surface of the first layer of elastic material silica sand or equivalent material is broadcast to form an outer surface. This outer surface may then be coated with various materials including acrylic, epoxy, or a combination of acrylic and epoxy material.

DESCRIPTION OF THE PREFERRED EMBODIMENT

Figure 1:
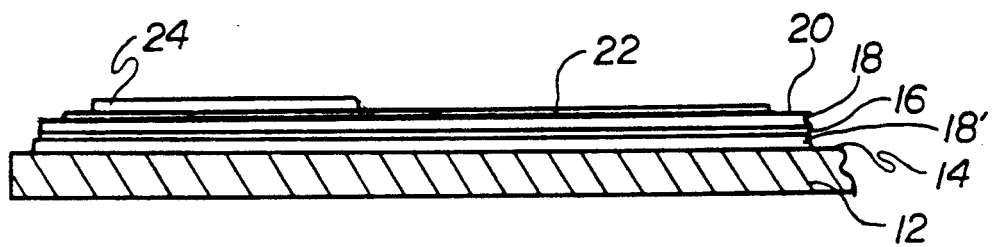
FIG. 1 is a view in cross-section of an underlying surface with an outer surface structure in accordance with this invention.

Referring to FIG. 1, there is shown what may be regarded as a substrate 12 to which there is applied the following to form an outer surface structure. First, a layer of urethane is applied to the outer surface 14 of the substrate 12. The urethane has embedded within it a fabric so that there is an outer urethane portion 18 keyed to the fabric and a portion between the fabric and the substrate 18'. The outer surface 20 is preferably provided with a broadcast coating of silica sand 22. To this, an outer coating 24 may be applied of any suitable material such as elastic material combined with acrylic and epoxy, or acrylic and epoxy separately. Indeed, cement and other type of gypsum materials may be applied. The silica sand and the urethane yield a mechanical and chemical bond for the layer 24 while the fabric 16 provides a structure to the urethane rigidifying it and lending structural integrity to it. In the preferred embodiment, the fabric is that which is commercially available from the BASF Corporation, Fibers Division, of Williamsburg, Va. which is an isotropic fabric which is strong in each direction and composed of a spun bonded, non-woven carrier component of a co-axial, bi-component fiber having a polyester core and polyamide skin jacketing the core.

While this invention has been shown and described in what is considered to be a practical and preferred embodiment, it is recognized that the departures may be made within the spirit and scope of this invention which should therefore not be limited except as set forth in the claims which follow and within the doctrine of equivalents.

What is claimed is:

1. A multilayer surface structure applied to the outer surface of an underlying structure, such as a roof, dock, walkway, pool, or the like, said multilayer surface structure comprising, a first layer of elastomeric material on said outer surface of the underlying structure, said first layer having an inside surface and an outer surface, a sheet of fabric embedded in the first layer of elastomeric material and comprising an intermediate layer, a second layer comprising a continuous coating of silica sand on the outer surface of said first layer, a third layer of hard protective material bonded to and covering the second layer selected from the group consisting of cementitious material, acrylic resin, epoxy resin and a combination of acrylic and epoxy resins, and said sheet of fabric comprising a spun bonded, non-woven, isotropic, fabric composed of a co-axial, bi-component fiber with a polyester core and a polyamide skin coating said core.

2. The device as set forth in claim 1 wherein said elastomeric material comprises urethane.

3. The multilayer surface structure as set forth in claim 1 wherein said third layer comprises a layer of acrylic material.

4. The multilayer surface structure as set forth in claim 1 wherein said third layer of hard protective material comprises epoxy material.

5. The multilayer surface structure as set forth in claim 1 wherein said third layer of hard protective material comprises cementitious material.

6. The multilayer surface structure as set forth in claim 1 wherein said third layer of hard protective material comprises a combination of acrylic and epoxy resins.

* * * * *